April 28, 1959
K. FARRER
2,884,115
MANUFACTURE OF BISCUITS
Filed March 27, 1956
6 Sheets-Sheet 1
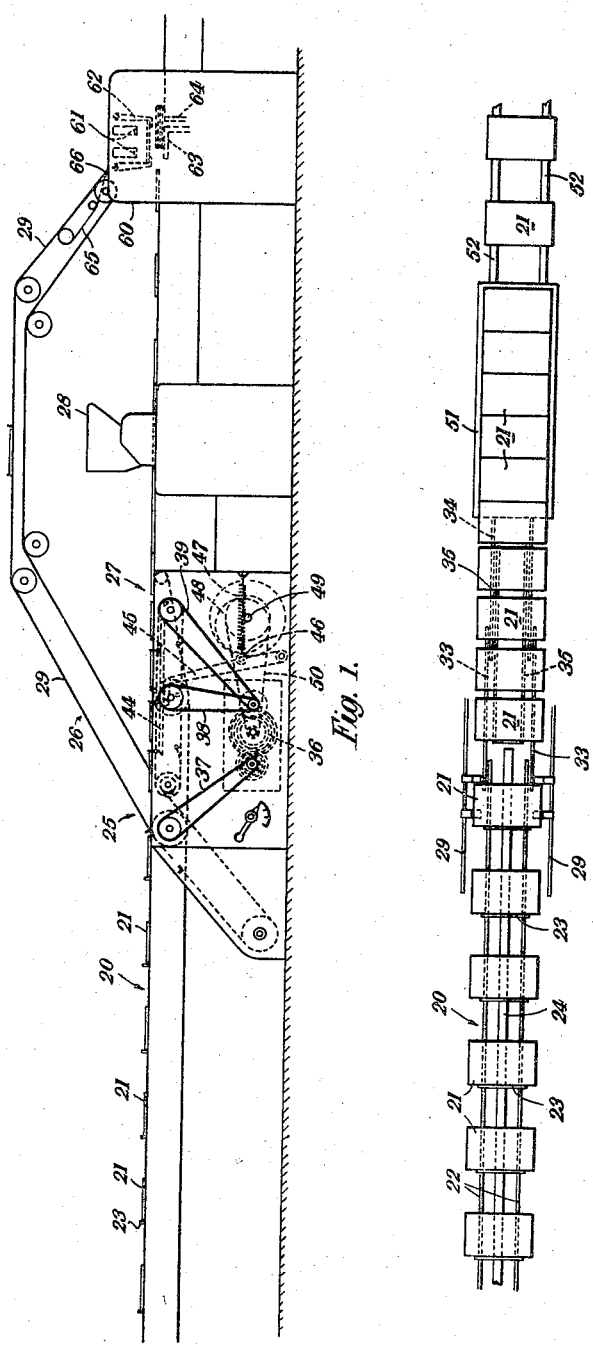
INVENTOR
KENNETH FARRER
By Watson, Cole, Grindle & Watson
ATTORNEYS April 28, 1959 K. FARRER 2,884,115
MANUFACTURE OF BISCUITS
Filed March 27, 1956 6 Sheets-Sheet 2

INVENTOR
KENNETH FARRER
By Watson, Cole, Grindle & Watson
ATTORNEYS

April 28, 1959 K. FARRER 2,884,115
MANUFACTURE OF BISCUITS
Filed March 27, 1956 6 Sheets-Sheet 3

INVENTOR
KENNETH FARRER
By Watson, Cole, Grindle & Watson
ATTORNEYS

April 28, 1959   K. FARRER   2,884,115
MANUFACTURE OF BISCUITS
Filed March 27, 1956   6 Sheets-Sheet 4
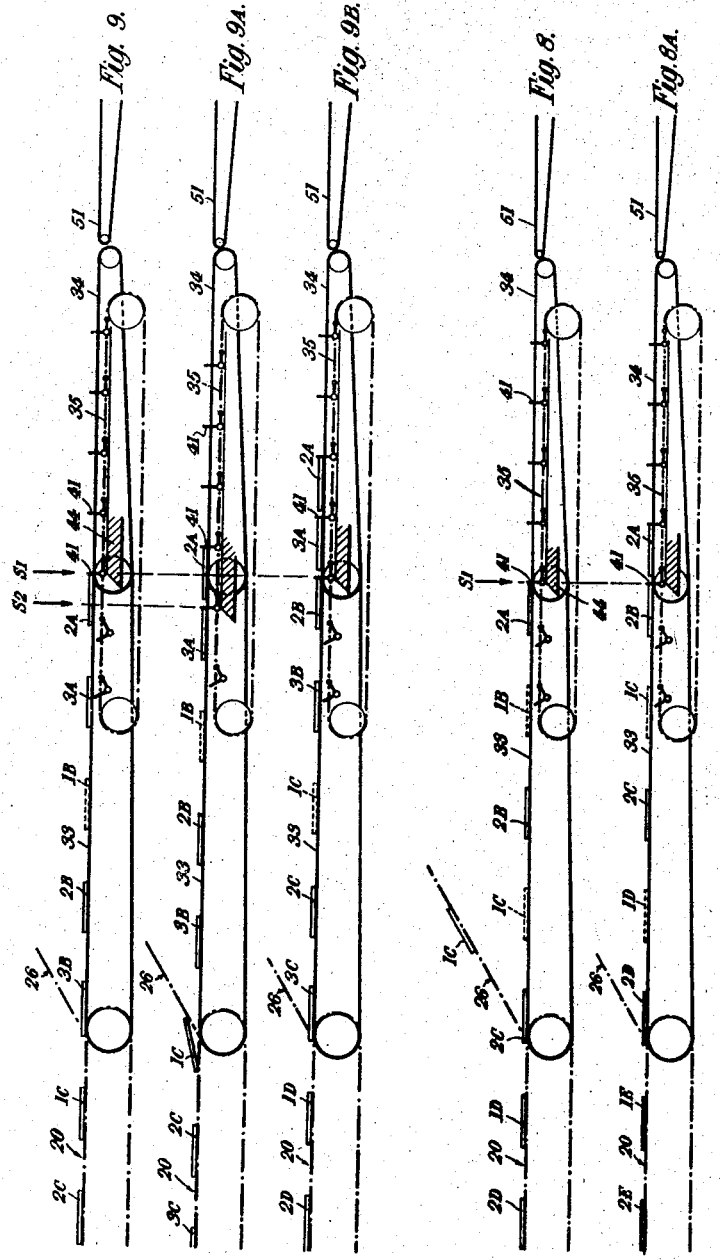
INVENTOR
KENNETH FARRER
ATTORNEYS

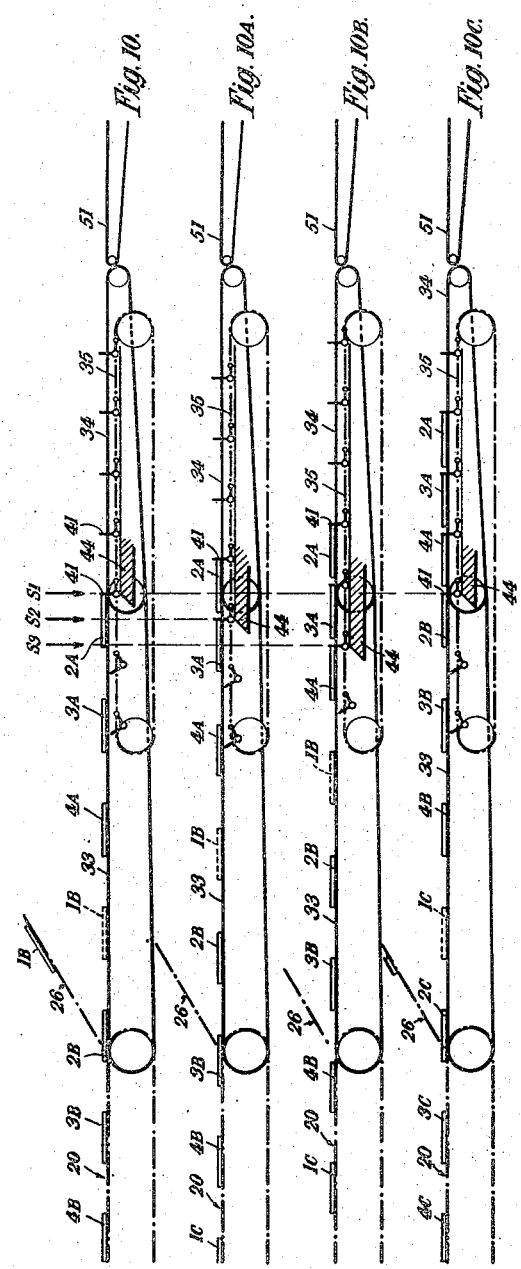

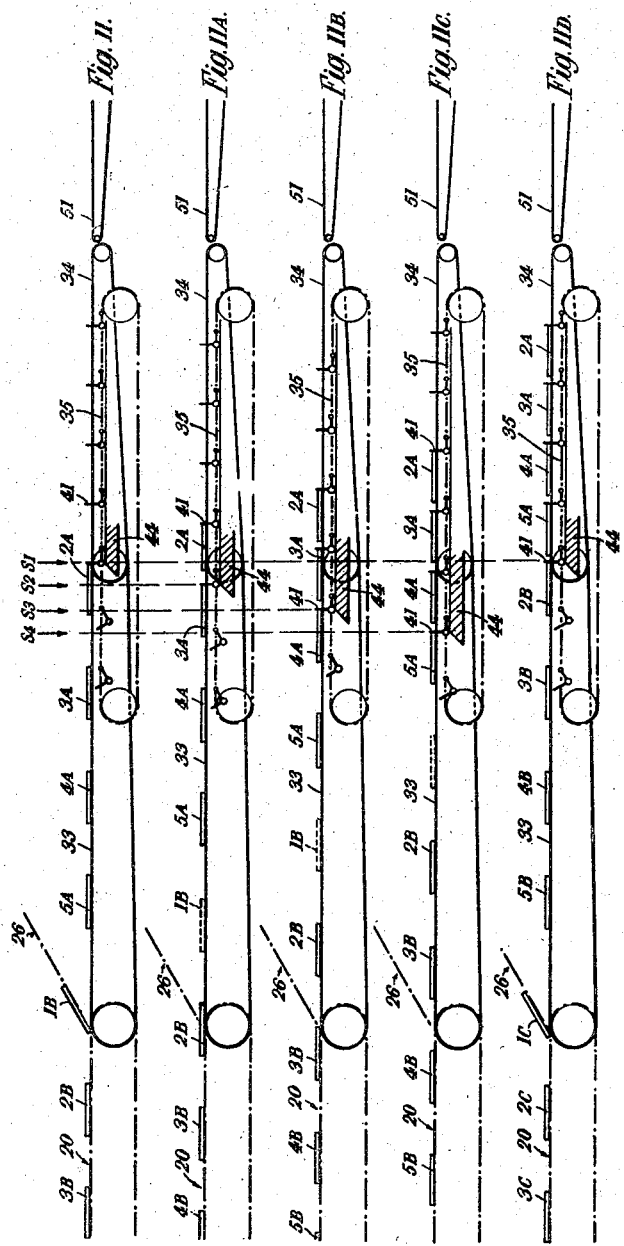

United States Patent Office
2,884,115
Patented Apr. 28, 1959

2,884,115

MANUFACTURE OF BISCUITS

Kenneth Farrer, Peterborough, England, assignor to Baker Perkins Limited, Peterborough, England, a company of Great Britain Application March 27, 1956, Serial No. 574,113

Claims priority, application Great Britain March 29, 1955

9 Claims. (Cl. 198—34)

This invention provides a selecting apparatus for diverting individual biscuits or like articles from an evenly spaced procession of such articles on a main conveyor, which is adjustable so as to permit of diversion at will of every alternate article, every third article, every fourth article and so on.

The selecting apparatus according to the invention comprises a selecting conveyor travelling in a path intersecting the path of the main conveyor, the selecting conveyor having members for engaging and diverting each $n^{th}$ article from the procession ($n$ being a small whole number exceeding unity) and being adjustable to vary the incidence of engagement of said members with the articles and therefore the value of $n$.

Preferably the selecting conveyor travels in the same direction as and at approximately the same speed as the main conveyor and has adjustable members which may be selectively moved from an inoperative to an operative position to vary the effective pitch of the selecting conveyor, i.e. so that the fingers engage and divert every other article from the procession, or every third article, or every fourth article and so on.

The articles left on the main conveyor will (except when $n=2$) be irregularly spaced, the spacing varying according to the setting of the selecting conveyor, and the apparatus according to the invention includes an adjustable marshalling unit for reducing and rendering uniform the spacing of the articles. This marshalling unit may comprise a marshalling conveyor aligned with and receiving the articles from the main conveyor, a peg conveyor travelling in the same direction as the marshalling conveyor and carrying retarding pegs, cam controlled mechanism for moving the pegs into cooperation with the articles on the marshalling conveyor to retard them and reduce the gaps between them, said cam controlled mechanism being adjustable to bring the pegs into cooperation with the articles at stations suited to their spacing in the procession, and a transfer conveyor receiving the articles from the marshalling conveyor and travelling more slowly so as to suit the reduced spacing of the articles in the procession.

One embodiment of the invention, which forms part of an apparatus for making wafer sandwiches, will now be described in more detail, by way of example with reference to the accompanying drawings, in which:

Fig. 1 is a side elevation of the selecting and marshalling unit,

Fig. 2 is a corresponding plan view,

Figure 5:
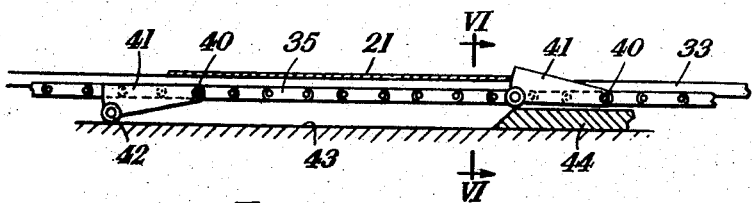
Figure 6:
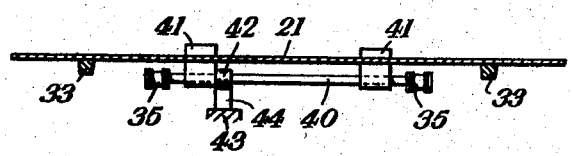

Fig. 5 is a diagrammatic longitudinal section, also on a larger scale, of the marshalling conveyor, Fig. 6 is a section on the line VI—VI in Fig. 5, Figs. 7, 7A and 7B are diagrams showing successive stages in the transfer of a wafer sheet from the main conveyor to the selecting conveyor, Figs. 8 and 8A are diagrams illustrating a cycle of operation of the marshalling unit in the case of a two-wafer sandwich, Figs. 9, 9A and 9B are diagrams illustrating a cycle of operation of the marshalling unit in the case of a three-wafer sandwich, Figs. 10, 10A, 10B and 10C are diagrams illustrating a cycle of operation of the marshalling unit in the case of a four-wafer sandwich, and Figs. 11, 11A, 11B, 11C and 11D are diagrams illustrating a cycle of operation of the marshalling unit in the case of a five-wafer sandwich.

Like reference numerals indicate like parts throughout the figures.

Figure 3:
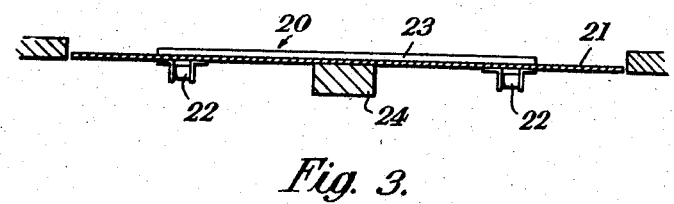
Fig. 3 is a cross section, on a larger scale, of the main receiving conveyor.

A main receiving conveyor 20, which receives individual wafer sheets 21 from one or more baking machines as described in U.S. Application Serial No. 574,158, filed March 27, 1956, comprises a pair of chains 22 (Fig. 3) carrying upstanding lugs 23 for feeding forward the wafer sheets and a fixed skid 24 disposed between the chains 22; the wafer sheets 21 lying flat on the conveyor with their ends projecting beyond the chains 22. The wafer sheets 21 are spaced by the lugs 23 at a uniform pitch, in the particular case under description 24″ from trailing edge to trailing edge, defined by the lugs.

The reciving conveyor 20 thus feeds a uniformly spaced procession of wafer sheets 21 along a horizontal path to a selecting station 25 (Fig. 1) where every $n^{th}$ sheet is removed from the procession by a selecting conveyor 26, the remaining sheets passing on via a marshalling apparatus 27 to a spreading machine 28 of known type, which applies a layer of cream or other sandwich filling to the upper surfaces of the sheets. If it is desired to cool the sheets, or condition them (e.g. by passage through a humid atmosphere) before spreading, the conveyor 20 can be arranged to traverse them through a cooling or conditioning chamber. Alternatively the sheets can be cooled and/or conditioned after they have passed the selecting station 25.

The selecting conveyor 26 comprises a pair of chains 29 (Fig. 4) disposed outside the chains 22 of the receiving conveyor in an upwardly inclined path, both conveyors travelling at the same speed, i.e. 40 ft. per minute. The chains 29 of the selecting conveyor carry fingers 30 for engaging the ends of wafer sheets 21 on the main conveyor 20 and diverting them from the procession thereon.

Figure 4:
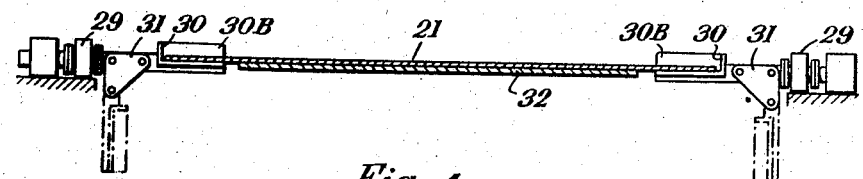
Fig. 4 is a cross section, also on a larger scale, of the selecting conveyor.
Figure 7:
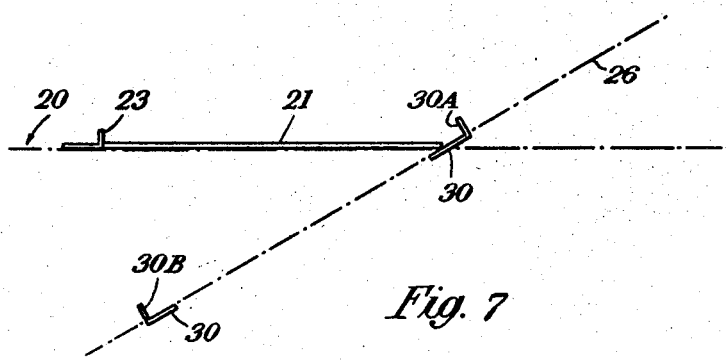
Figure 7A:
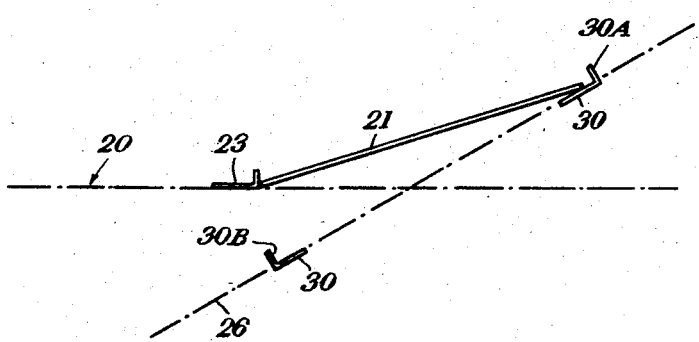
Figure 7B:
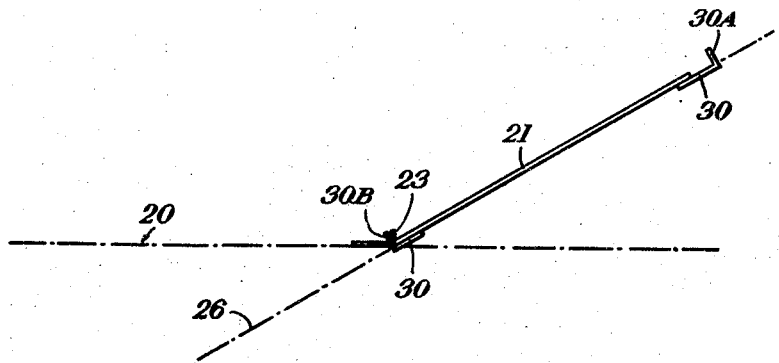

The fingers 30 may be attached to brackets 31 in alternative positions, viz. an operative position shown in full lines in Fig. 4, in which they are effective to engage and lift a wafer sheet 21 from the main conveyor 20, and an inoperative position shown in chain-dotted lines in Fig. 4. As shown in Figs. 7, 7A and 7B successive pairs of fingers have upstanding flanges 30A, 30B at their leading and trailing edges respectively. The front pair of fingers 30 engages beneath the leading edge of the oncoming wafer sheet 21, as shown in Figs. 7, 7A, to lift it off the conveyor 20 and finally, as shown in Fig. 7B, the rear pair of fingers 30 engages beneath the trailing edge of the wafer sheet, the flanges 30B acting as pushers during travel of the wafer sheets along the upward and horizontal runs of the selecting conveyor 26. This conveyor takes the dry wafer sheets separated from the procession on the main conveyor 20 to a sandwiching machine 60, described in detail in U.S. Application Serial No. 574,197, filed March 27, 1956, now Patent No. 2,838,010, where the dry wafer sheets are combined with the appropriate number of creamed wafer sheets from the spreading machine 28. The flanges 30A on the leading fingers 30 support the wafer sheets when on the downward run of the selecting conveyor 26. A belt 32 (shown in Fig. 4 but not in Fig. 1) supports the wafer sheets during their travel on the conveyor 26 from the separating station 25 to the sandwiching machine 60.

The sandwiching machine, which is fully described in U.S. Application Serial No. 574,197, filed March 27, 1956, now Patent No. 2,838,010, comprises dry wafer fingers 61 for receiving the dry wafer sheets from the conveyor 26, support fingers 62 into which the dry wafer sheets fall from the fingers 61, a reciprocating table 63 which co-operates with the fingers 62 to form a sandwich consisting of one or more creamed wafer sheets topped by a single dry wafer sheet, and a stop 64 which is periodically withdrawn, as shown, to allow the conveyor to feed completed wafer sandwiches forward. The dry wafer sheets are guided from the downward run of the conveyor 26 into the fingers 61 by means of a band 65 running over a nose piece 66.

As will be readily understood, by appropriate adjustment of the positions of the fingers 30, the selecting conveyor 26 may be arranged to divert every other sheet from the conveyor 20 in the case when a two-wafer sandwich is to be made, every third sheet in the case of a three-wafer sandwich and so on.

In order to effect selection of the number of dry wafer sheets appropriate to the chosen value of $n$ the effective pitch of the selecting conveyor 26 will be as follows:

2-wafer sandwich_____ operative fingers at 48″ pitch.
3-wafer sandwich_____ operative fingers at 72″ pitch.
4-wafer sandwich_____ operative fingers at 96″ pitch.
5-wafer sandwich_____ operative fingers at 120″ pitch.

It will be appreciated that in order to obtain the values of pitch shown in this table the selecting conveyor 26 will be provided with fingers 30 at 24″ pitch.

The dimension of the sheets 21 in the lengthwise direction of the conveyor 20 being approximately 11½″, the spacing of the non-selected sheets on the conveyor beyond the selecting station 25 will be approximately as follows:

2-wafer sandwich. sheets uniformly spaced, at 48″ pitch.
3-wafer sandwich. 2 sheets at 24″ pitch, followed by a sheet at 48″ pitch.
4-wafer sandwich. 3 sheets at 24″ pitch, followed by a sheet at 48″ pitch.
5-wafer sandwich. 4 sheets at 24″ pitch, followed by a sheet at 48″ pitch.

The marshalling unit 27 has to cater for this irregular spacing of the sheets remaining on the conveyor 20 and to close them up into close abutment as they pass on to the band of the spreading machine. The sheets moreover require to be traversed through the spreading machine 28 more rapidly in the case of a 5-wafer sandwich, where 4 sheets of each 5 produced by the baking machine have to be creamed, than in the case of a 4-wafer sandwich, more slowly in the case of a 3-wafer sandwich and still more slowly in the case of a 2-wafer sandwich.

The marshalling unit has two pairs of horizontally travelling bands (referred to as marshalling bands 33 and transfer bands 34 respectively), the sheets being transferred in succession from the conveyor 20 to the marshalling bands 33. The spacing of the sheets is rendered uniform, the pitch being reduced to 13.8″, just before they pass to the transfer bands 34 which move more slowly than the marshalling bands 33.

The marshalling bands 33 are driven at the same speed, 40 ft. per minute, as the conveyor 20, but the transfer bands 34 and a pair of marshalling peg chains 35 are driven at the same speed, which is slower than that of the marshalling bands 33, through a change-speed gear box 36. The gear box also drives the marshalling bands 33 by a chain and sprocket drive 37 and the transfer bands 34 and the marshalling chains 35 are respectively driven from the gear box by chain and sprocket drives 38, 39. The transfer bands 34 and the marshalling chains 35 are driven, by adjustment of the gear box 36, at the following speeds in accordance with the type of sandwich being made:

| | Ft./min. |
|---|---|
| 2-wafer sandwich | 11.5 |
| 3-wafer sandwich | 15.33 |
| 4-wafer sandwich | 17.25 |
| 5-wafer sandwich | 18.4 |

The uniform spacing of the sheets 21 is effected by the marshalling chains 35 which run at a level below that of the upper run of the marshalling bands 33 as indicated in Figs. 5 and 6. Extending at intervals between the chains 35 are rods 40, each carrying a pair of pegs 41. One peg of each pair carries a roller 42 which runs along a horizontal surface 43, as indicated at the left hand side of Fig. 5, until it meets a sliding trip cam 44. So long as the roller 42 is on the surface 43 the pegs 41 remain below the level of the marshalling bands 33, but as soon as the roller 42 rides up on to the cam 44 the pegs 41 are raised into the path of an oncoming sheet 21 to retard it as shown at the right hand side of Fig. 5 and in Fig. 6. The pegs 41 are pitched at 13.8″ apart and the cam 44 is movable by a lever 45 (Fig. 1) which carries a follower 46 urged by a spring 47 into contact with one of a series of cams 48 on a cam shaft 49. The cam shaft 49, which is driven from the gear box 36 at a variable speed related to that of the transfer bands 34 by a drive 50, may be shifted axially, according to the make-up of the wafer sandwich, to bring the cams 48 alternatively into position to govern the movement of the trip cam 44. Alternatively, a fixed cam shaft may be used and alternative cams fitted to it.

After the spacing of the sheets has been rendered uniform by the marshalling unit 27, as will shortly be described in detail, they pass from the transfer bands 34 to a spreader band 51 which carries them beneath the spreader 28. The spreader band 51, moves more slowly than the transfer bands 34, so that the procession of sheets on the spreader band is completely closed up. The spreader band 51 receives its drive from the drive to the transfer bands 34 so that it keeps in step with the four speeds of the transfer bands. A variable speed gear (not shown) is incorporated for fine adjustment of the spreader band speed.

The speeds of the spreader band corresponding to those of the transfer bands given previously are:

| | Ft./min. |
|---|---|
| 2-wafer sandwich | 9.58 |
| 3-wafer sandwich | 12.77 |
| 4-wafer sandwich | 14.37 |
| 5-wafer sandwich | 15.33 |

The creamed sheets leaving the spreader 28 are conveyed to the sandwiching machine 60 by bands 52 (Fig. 2) which travel more quickly than the spreader band 51 and space the sheets out to form a uniformly spaced procession as shown at the right hand side of Fig. 2.

The way in which the marshalling unit operates selectively to close up the gaps in the procession of sheets 21 leaving the selecting station 25 in accordance with the make-up of the sandwich will now be described in detail with reference to Figs. 8–11. Successive sandwiches are identified in these figures by the letters A, B, C etc. and the component sheets of these sandwiches are identified by the associated letter together with a numeral, the component sheets being numbered in succession, commencing with the numeral 1, from front to rear in the procession.

In the case of the 2-wafer sandwich shown in Figs. 8 and 8A, every alternate sheet, i.e. 1A, 1B, 1C . . ., is removed by the selecting conveyor 26 and the marshalling unit has to deal with a procession of sheets 2A, 2B, 2C . . . spaced uniformly at 48″ pitch. The marshalling chains 35 and the transfer bands 34 travel at 11.5 ft./min.

and a circular cam on and coaxial with the cam shaft 49 is then operative on the follower 46 with the result that the trip cam 44 occupies a fixed station indicated as S1. The pegs 41 are accordingly raised in succession at this station, a peg 41 being raised to retard the sheet 2A as its leading edge reaches this station (Fig. 8), the next peg 41 being raised to retard the sheet 2B as its leading edge reaches this station (Fig. 8A) and so on. The effect is to reduce the spacing of the sheets to a uniform pitch of 13.8".

In the case of the 3-wafer sandwich shown in Figs. 9, 9A and 9B, each third sheet, i.e. 1A, 1B, 1C . . . is removed by the selecting conveyor 26 and the marshalling unit has to deal with a procession of sheets consisting of sheets 2A and 3A at 24" pitch, followed by sheet 2B at 48" pitch from 3A and so on. The gear box is adjusted to cause the marshalling chains 35 and the transfer bands 34 to travel at 15.33 ft./min. and the cam shaft 49 is shifted to cause the trip cam 44 to be moved periodically from station S1 to a station S2 and back again. The trip cam 44 raises a peg 41 at station S1 into each long gap in the procession and raises a peg 41 at station S2 into each short gap in the procession. Thus the leading edge of sheet 2A (which is spaced from its predecessor by a long gap) is retarded by a peg 41 when it reaches station S1 (Fig. 9). The trip cam 44 is then moved forward to station S2 (Fig. 9A) and causes the next peg 41 to rise to engage the leading edge of the next sheet 3A as it reaches station S2. The trip cam is then moved back to station S1 (Fig. 9B) and rises to engage the leading edge of the next sheet 2B when it reaches station S1. Again the effect is to reduce the spacing of the sheets to a uniform pitch of 13.8".

In the case of the 4-wafer sandwich shown in Figs. 10, 10A, 10B and 10C, each, fourth sheet, i.e. 1A, 1B, 1C . . . , is removed by the selecting conveyor 26 and the marshalling unit has to deal with a procession of sheets consisting of 2A, 3A and 4A at 24" pitch followed by 2B at 48" pitch and so on. The gear box is adjusted to cause the marshalling chains 35 and the transfer bands to travel at 17.25 ft./min. and the cam shaft 44 is shifted to bring another cam into operation. The trip cam 44 is then periodically moved from station S1 to stations S2 and S3 and then back to station S1, the pegs 41 coming up in the long gaps at station S1, in the first short gap at station S2 and in the second short gap at station S3. Figs. 10, 10A, 10B and 10C respectively show a peg 41 being brought up to retard sheet 2A at station S1, sheet 3A at station S2, sheet 4A at station S3 and sheet 2B again at station S1. The effect once more is to reduce the spacing of the sheets to a uniform pitch of 13.8".

In the case of the 5-wafer sandwitch shown in Figs. 11, 11A, 11B, 11C and 11D, each fifth sheet, i.e. 1A, 1B, 1C . . ., is removed by the selecting conveyor 26 and the marshalling unit has to deal with a procession of sheets consisting of 2A, 3A, 4A and 5A at 24" pitch followed by 2B at 48" pitch and so on. The gear box is adjusted to cause the marshalling chains to travel at 18.40 ft./min. and the cam shaft 49 is shifted to bring yet another cam into operation. The trip cam 44 is then periodically moved from station S1 to stations S2, S3 and S4 and then back to station S1, the pegs 41 coming up in the long gaps at station S1 and in the three short gaps at stations S2 and S3 and S4. Figs. 11, 11A, 11B, 11C and 11D respectively show a peg 41 being brought up to retard sheet 2A at station S1, sheet 3A at station S2, sheet 4A at station S3, sheet 5A at station S4 and sheet 2B at station S1. The effect again is to reduce the spacing of the sheets to a uniform pitch of 13.8".

In fact the positions of station S2 are slightly different for 4- and 5-wafer sandwiches than is its position for a 3-wafer sandwich, while the position of station S3 differs slightly in the case of 4- and 5-wafer sandwiches but to simplify the above explanation the positions of these stations have been assumed to be the same for all types of sandwich.

To adjust the marshalling unit to suit the various make-ups of sandwich, the operator merely has—

(a) to adjust the fingers 30 on the selecting conveyor 26,
(b) to adjust, by means of the gear box 36, the speeds of the cam shaft 49, the marshalling chains 35 and the transfer bands 34,
(c) to select the appropriate cam 48 for coaction with the trip cam 44.

As an alternative to using movable pegs 41, the marshalling chains 35 may have pegs which project permanently from their upper run, and the cam shaft 49 may be arranged to control the position of jockey pulleys which lift a variable portion of the upper run of the chains into a position such that the pegs are effective to retard the sheets.

It would not be practicable to close up the procession of wafer sheets in one operation by direct transfer of the sheets from the main conveyor 20 to a more slowly moving conveyor band, because there would be so much slip between the main (or marshalling) conveyor and the retarded sheets that there would be a considerable danger of overcrowding and piling up of the sheets. By gradually closing the gaps as described above, it is possible to bring the sheets into close abutment accurately and without any risk of piling up. The variable speed for the spreader 28 ensures perfect butting up of the sheets as they travel on to the spreader band 51.

What I claim as my invention and desire to secure by Letters Patent is:

1. In combination a main conveyor for feeding a procession of biscuits or articles of like shape, said main conveyor including means for maintaining the articles in the procession spaced apart at equal intervals, a selecting conveyor travelling in a path intersecting the path of the main conveyor, article-engaging members mounted on the selecting conveyor and arranged to engage and lift from the main conveyor every $n$th article in the procession, $n$ being a small number exceeding unity, said selecting conveyor being adjustable to vary the incidence of engagement of said article-engaging members with said articles and thereby to vary the value of $n$ and an adjustable marshalling unit for rendering uniform the spacing of the articles left on the main conveyor.

2. In combination a main conveyor for feeding a procession of biscuits or articles of like shape, said main conveyor including means for maintaining the articles in the procession spaced apart at equal intervals, a selecting conveyor travelling in a path inclined upwardly in relation to the path of the main conveyor and article-engaging members mounted on the selecting conveyor and arranged to engage and lift from the main conveyor every $n$th article in the procession, $n$ being a small number exceeding unity, said selecting conveyor being arranged to travel in the same direction as and at substantially the same speed as the main conveyor and said article-engaging members being individually movable in relation to the selecting conveyor from an operative article-engaging position to an inoperative position.

3. In combination a main conveyor for feeding a procession of biscuits or articles of like shape, in a substantially horizontal path, said main conveyor including means for maintaining the articles in the procession spaced apart at equal intervals, a selecting conveyor travelling in a path inclined upwardly in relation to the path of the main conveyor, means on said selecting conveyor for engaging and lifting from the main conveyor every $n$th article in the procession, $n$ being a small number exceeding unity, said selecting conveyor being adjustable to vary the incidence of engagement of said article-engaging members with said articles and thereby to vary the value of $n$, and an adjustable marshalling unit for reducing and rendering uniform the spacing of the articles left on the main conveyor.

4. Apparatus as claimed in claim 3, wherein the marshalling unit comprises a peg conveyor arranged to travel in the same direction as the procession but at a slower speed, retarding pegs carried by the peg conveyor, cam controlled mechanism for moving the pegs into cooperation with the articles in the procession to retard them and reduce the gaps between them, said cam controlled mechanism being adjustable to bring the pegs into cooperation with the articles at stations suited to their spacing in the procession, and a transfer conveyor for receiving the articles retarded by the peg conveyor and arranged to travel at a speed substantially the same as that of the peg conveyor.

5. Apparatus as claimed in claim 3, where the marshalling unit comprises a marshalling conveyor aligned with and arranged to travel at the same speed as the main conveyor and to receive the articles therefrom, a peg conveyor having an upper run disposed beneath the upper run of the marshalling conveyor, means for driving the peg conveyor in the same direction as but at a slower speed than the marshalling conveyor, retarding pegs carried by the peg conveyor, cam controlled mechanism including a reciprocable trip cam for moving the pegs into cooperation with the articles on the marshalling conveyor to retard them and reduce the gaps between them, said cam controlled mechanism being adjustable to bring the pegs into cooperation with the articles at stations suited to their spacing in the procession, and a transfer conveyor for receiving the articles retarded by the peg conveyor and arranged to travel at a speed substantially the same as that of the peg conveyor.

6. Apparatus as claimed in claim 5, wherein the cam controlled mechanism includes a series of cams adapted to be brought selectively into position to impart movement to the trip cam to control the movement thereof in accordance with changes in the adjustment of the selecting conveyor and comprising means for varying the speed of the peg conveyor and of the transfer conveyor to suit changes in the adjustment of the selecting conveyor.

7. Apparatus as claimed in claim 6, wherein the speed varying means is a change-speed gear box which also drives a cam shaft carrying said series of cams.

8. In combination a main conveyor for feeding a procession of biscuits or articles of like shape, said main conveyor including means for maintaining the articles in the procession spaced apart at equal intervals, a selecting conveyor travelling in a path inclined upwardly in relation to the path of the main conveyor and groups of article-engaging fingers on said selecting conveyor arranged to engage and lift from the main conveyor every $n$th article in the procession, $n$ being a small whole number exceeding unity, each group of fingers comprising a front pair for engaging beneath the leading edge of an article on the main conveyor and a rear pair for engaging beneath and supporting the trailing edge of said article as it travels upwardly on the selecting conveyor.

9. Marshalling apparatus for reducing and rendering uniform the spacing of a procession of biscuits or articles of similar shape on a conveyor, said apparatus comprising a peg conveyor arranged to travel in the same direction as the procession but at a slower speed, retarding pegs carried by the peg conveyor, cam controlled mechanism for moving the pegs into cooperation with the articles in the procession to retard them and reduce the gaps between them, and a further conveyor for receiving the articles retarded by the peg conveyor and arranged to travel at the same speed as the peg conveyor.

References Cited in the file of this patent

UNITED STATES PATENTS

| | | |
|---|---|---|
| 219,871 | Olin | Sept. 23, 1879 |
| 801,523 | Hinchman | Oct. 10, 1905 |
| 1,575,207 | Hungerford | Mar. 2, 1926 |
| 1,830,359 | Hamel | Nov. 3, 1931 |
| 2,037,931 | Schmidt | Apr. 21, 1936 |
| 2,085,410 | Bergmann | June 29, 1937 |
| 2,167,343 | Bergmann | July 25, 1939 |
| 2,503,864 | Carter | Apr. 11, 1950 |
| 2,583,847 | Hummel | Jan. 29, 1952 |
| 2,780,342 | Good | Feb. 5, 1957 |